Aug. 16, 1955  J. W. ANDERSON  2,715,729
WINDSHIELD WIPER ARM
Filed July 3, 1951
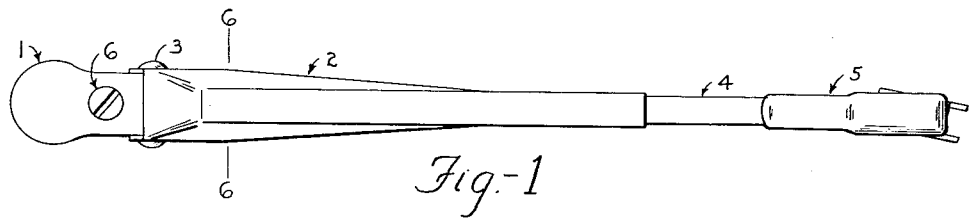
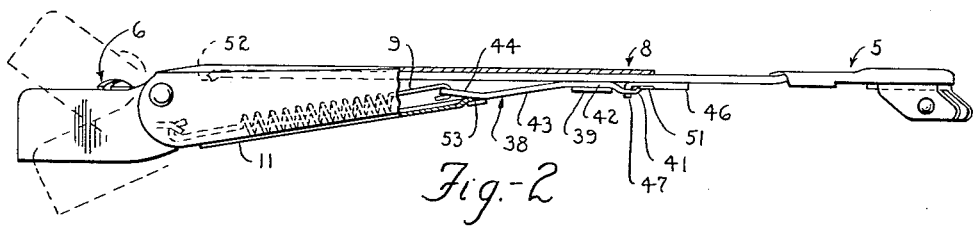
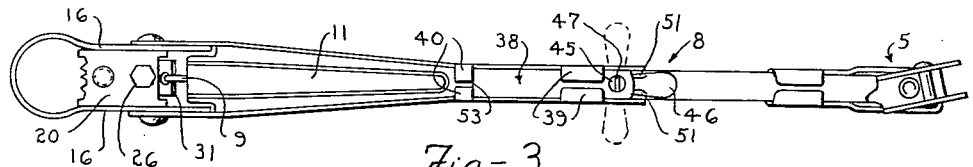
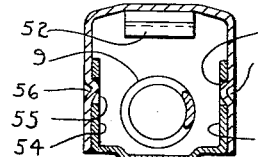
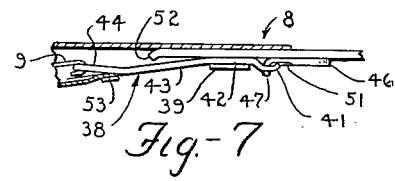
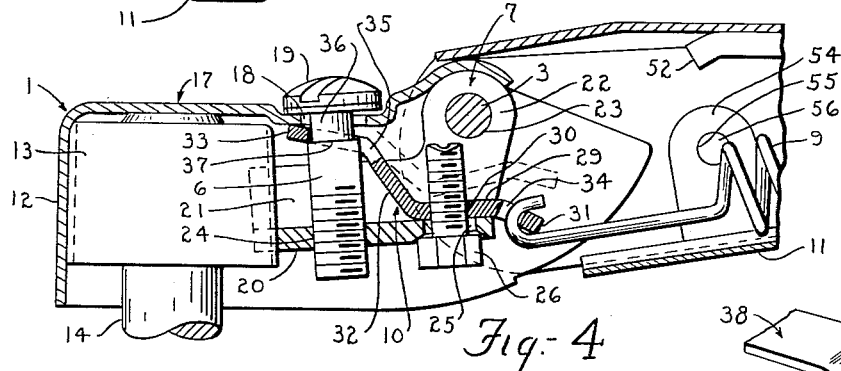
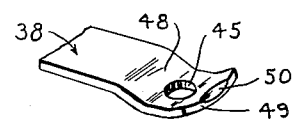
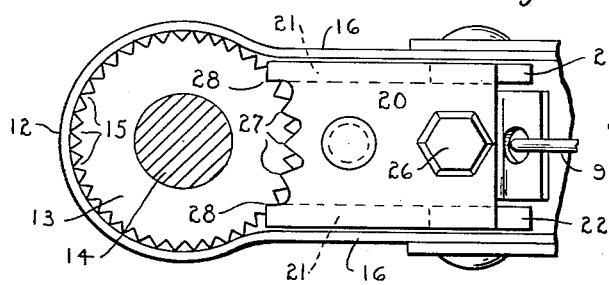
INVENTOR.
JOHN W. ANDERSON
BY
Charles S. Penfold
ATTORNEY

United States Patent Office 2,715,729
Patented Aug. 16, 1955

2,715,729
WINDSHIELD WIPER ARM

John W. Anderson, Gary, Ind., assignor to Productive Inventions, Inc., a corporation of Indiana Application July 3, 1951, Serial No. 235,001

6 Claims. (Cl. 15—255)

This invention relates generally to windshield wiper arms and particularly to improvements for detachably connecting an arm to a drive shaft.

The invention is adapted for use with a wiper arm assembly comprising an inner shaft receiving section, an outer arm unit pivotally connected to the inner section, and a spring for urging the arm and a wiper blade carried thereby toward a windshield.

The primary object of the invention is to provide the inner shaft receiving section of the arm assembly with a device comprising a locking element for engaging the shaft, means for manually operating the element, and a connection between the spring and device so that when the manual operating means is manipulated to disengage the element from the shaft, the spring will automatically cause the device to move outwardly away from the shaft and thereby assist in disconnecting the arm assembly from the shaft. The arrangement is preferably such that the spring offers sufficient tension to prevent accidental movement of the manually operating means after it has been adjusted to cause the element to lock the arm assembly to a shaft.

An important object of the invention is to provide a novel method by which the pressure of a member of a mechanical assembly is varied without appreciably varying the effective power of the pressure producing member, which method makes available important advantages in the application and operation of tension producing members.

In constructions where the pressure is varied by varying internal stresses of the tension producing member, such as by extending the effective length of a coil spring or by increasing the distortion of a leaf spring, the increased tensions tend to promote crystallization and shorten the life of the tension producing member. The present invention, by merely moving one of the points of suspension of the spring directly with relation to the center of the pivot 3 upon which is carried the outer arm unit by which pressure is transmitted to the wiper blade, produces no appreciable variations in the internal tension of the spring itself in the process of varying the pressure applied to the wiper blade.

It is obvious that with the axis of the spring positioned to intersect the center of pivot 3 there could be no pressure developed upon the blade by the spring. As the axis of the spring is moved away from its point of intersection with the center of pivot 3, and toward its position shown in Figure 4 of the drawing, the leverage by which the spring acts to produce pressure upon the blade is increased and the pressure upon the blade is increased thereby substantially in proportion to the distance it is moved away from pivot 3.

This feature makes possible a design of windshield wiper arm, for example, in which it is unnecessary to provide additional space for the functioning of a spring in which, conventionally, the work effect of the spring is varied by distortion of the spring. This advantage simplifies design and makes possible a more compact arrangement of parts and a corresponding saving in material costs. To provide, in the present invention, as shown in the drawings, capacity for varying the work effect of the spring, by the conventional method of expanding or shortening the spring, to a degree or extent equal to that made possible and practicable by the construction and arrangement shown in the drawings, would require either a spring of impractical weight, resistance, and power or would require an impractical longitudinal extension of the housing for the spring, or both.

One of the problems in manufacture of springs is to hold them closely to the same length and strength. This is particularly important where a considerable extension or contraction of the length of the spring is essential for adjustment of its effective power. Due to the wider range of adjustability provided by the "off center" principle incorporated in the subject invention, costly precautions and close inspections otherwise required to provide, in the manufacture of the springs, sufficient uniformity to make their use practicable by the conventional method, are minimized.

The present "off center" invention need not be constructed and arranged precisely and so as to eliminate all expansion and contraction of the spring as it is adjusted for different weight loads. It is only necessary to make and arrange the parts with sufficient precision to minimize adequately the disadvantageous conditions herein mentioned as existing with the conventional arrangement. The advantages of the subject invention are such that holding its parts, within ordinary manufacturing limits of dimension makes substantially available all the described advantages.

Another object of the invention is to provide an arm assembly in which the locking device, above referred to, is provided with adjustable means whereby to permit changing of the position of the leverage of the spring without changing the effective length or tension of the spring, so that one can readily vary the pressure at the outer end of the wiper arm for urging a blade against a windshield.

An important object of the invention is to provide an arm assembly in which the locking element is mounted on the pivot which connects the shaft receiving section with the outer arm unit.

A significant object of the invention is to provide an arm construction in which the outer arm unit includes an intermediate channel section pivotally secured to the inner shaft receiving section, an extensible bar section slidably mounted in the channel section, and a novel friction locking assembly for locking the bar section in any longitudinal position desired.

A particular object of the invention is to provide an arm construction of the character just referred to in which the outer bar section and the friction locking assembly may be readily connected with the intermediate channel section without the aid of tools.

Another object of the invention is to provide an arm assembly in which the spring for urging the outer arm unit toward a windshield also urges the locking element and adjustable means carried thereby outwardly, and the holding components of the friction locking assembly detachably connected with the outer arm unit, as well as assist in securing the cover assembled with the arm. More particularly, the arrangement in one aspect is preferably such that by merely moving one component of the locking assembly in one position, the extensible bar section can be adjusted to any one of an infinite number of longitudinal positions and then locked in place by moving said component to another position.

A further object of the invention is to provide a cover or shroud for the spring and a novel means for connecting it to the arm assembly.

Other objects and advantages of the invention will appear after the description hereinafter set forth is considered in conjunction with the drawings annexed hereto.

In the drawings where like parts are identified by the same numerals:

Figure 1 is a top view of the arm assembly embodying the invention;

Figure 2 is a side view in elevation of the arm assembly shown in Figure 1 with portions in section to illustrate details of construction;

Figure 3 is a bottom view of the arm assembly;

Figure 4 is an enlarged longitudinal sectional view taken through a portion of the arm assembly to exemplify its operative relationship with a drive shaft;

Figure 5 is an enlarged bottom view of a portion of the arm assembly showing an interlocking between a locking element on the arm assembly and a key or drum carried by a shaft;

Figure 6 is a transverse sectional view taken substantially on line 6—6 of Figure 1 showing the way one extremity of the cover is secured to the arm;

Figure 7 is a longitudinal sectional view of a portion of the intermediate channel section of the arm assembly showing the novel locking means whereby the outer bar section of the assembly can be secured in any one of an infinite number of positions to which it may be adjusted; and Figure 8 is an enlarged perspective view of a portion of one of the components of the locking means on the outer arm unit.

The arm assembly above referred to generally includes, among other things, an inner shaft receiving section or fitting 1, an intermediate channel section 2 pivotally connected to the inner section 1 by means of a cross pin or pivot 3; an extensible bar section 4 slidably mounted in the channel section; a connector 5 carried by the free end of the bar section for supporting a wiper blade; a locking device comprising a manually operable means 6 and a locking element 7; a friction locking assembly 8 for locking the extensible section in any longitudinal position desired; an elongated helical spring 9 having one end attached to an adjustable means or connector 10 on the locking device and its other end to the friction locking assembly for urging the channel and bar sections as a unit toward a windshield; and a cover 11 for the spring.

The shaft receiving section 1 of the wiper arm assembly and locking device associated therewith will be described first. The section 1 is preferably constructed from sheet metal and made in the form of a cap or housing to provide a tapered cylindrical socket 12 which receives a tapered cylindrical fitting or drum 13, the latter being secured for movement with a drive shaft 14. The drum may be a separate part secured to the shaft or constitute an integral part or enlargement thereof. The periphery of the drum is provided with a plurality of relatively fine longitudinal serrations or teeth 15, the majority of which intimately engage the tapered inner cylindrical wall of the socket when the cap section is pressed onto the drum. The serrations 15 are clearly shown in Figure 5 but have been omitted from Figure 4 in order to clarify the structure of the assembly.

The cap section includes a radial channel offset having parallel side walls 16 which merge with the wall defining the socket 12 and an outer wall 17 which is common to the socket and the radial channel. That portion of the outer wall 17 which constitutes the base wall of the socket may engage the shaft as shown or the outer end of the drum to limit inward movement of the cap section when it is applied to the drum. That portion of the outer wall constituting the base wall of the radial channel is formed with a depression having an opening 18 therein. The manual operating means 6 preferably made in the form of a screw has its head 19 seated in the depression.

The locking element 7 is preferably elongated and one extremity thereof is threadedly connected to and supported by the screw 6 and its other extremity is pivotally mounted on the cross-pivot 3, the latter constituting a fulcrum for the element when the screw is tightened. This element may be designed and constructed as desired, but as herein shown includes a base portion 20 and a pair of corresponding parallel wall portions 21 provided with upturned ears 22 having holes 23 therein which receive the pivot 3. The base portion 20 is provided with a threaded aperture 24 intermediate its ends through which the shank of the screw 6 extends. Base portion 20 is also provided with a hole 25. A screw 26 extends loosely through this hole and is threadedly connected to the adjustable means 10. This adjustable means which is connected to the spring will be described more in detail subsequently. Attention is directed to the fact that the pivot 3 is located relatively close to the frontal portions of sections 1 and 2 of the arm assembly. Otherwise expressed, the pivot 3 is preferably located substantially in alignment with the outer wall 17 of the cap section 1 so as to provide ample space therebelow for movement of locking element 7 and for the purpose of locating the connection between the locking element and the spring 9 in a predetermined position spaced from the pivot 3 so that the spring, among other things, will pull the outer arm unit toward a windshield. It should also be noted that the widths of the locking element and the radial channel portion of the cap section are such that the locking element is in some measure guided by the walls 16 of the radial channel. These structural arrangements plus the fact that the side walls of the locking element are supported adjacent the extremities of the cross-pivot affords a well stabilized assembly for restricting movement of the locking element to a predetermined plane.

The inner marginal edge of base portion 20 of the locking element is provided with a plurality of projections or teeth 27. The teeth 27 are inset with respect to the inner marginal ends of the side walls 21 of the locking element and the inner opposed parallel arrises of the walls are formed to provide teeth 28 of considerable length. The teeth 27 and 28 are preferably arcuately disposed so as to substantially conform to the curvature of the serrated drum 13. The spacing of these teeth is preferably somewhat greater than the circumferential spacing of the teeth or serrations 15 on the drum so that regardless of the rotative position of the arm on the drum, the teeth on the locking element will more or less automatically fit in between the teeth on the drum as clearly illustrated in Figure 5 of the drawing. With this setup the locking element will embrace a portion of the drum and the elongated teeth 28 on the side walls of the locking element will engage the drum for a considerable longitudinal distance to promote stability and insure a good grip on the drum when the screw is tightened. Tightening of the screw 6 also causes the locking element to draw the cap section onto the drum 13. This arrangement prevents canting of the locking device with respect to the drum and maintains the locking element in correct alignment with the drum. Due to the fact that the drum is made of a softer material than the locking element, the teeth on the latter will actually bite into and distort a portion of the drum to afford a positive lock between the arm assembly and shaft 14. Attention is further directed to the fact that when the screw is tightened the locking element will in effect be wedged in between the pivot 3 and the drum and that such wedging action tends to draw the cap section tightly onto the drum. When the screw 6 is loosened the spring 9 will function to automatically pull the locking element outwardly so as to disengage it from the drum and thereby assist in disconnecting the arm from the drum. The connection between the screw, locking element and the cap section is preferably such that the screw 6 may pivot when manipulated.

The adjustable means or movable means 10 may be designed and constructed in various ways but as herein shown preferably includes a connector lever arranged substantially within the locking element. As exemplified in Figure 4, this lever includes a portion 29 provided with a threaded aperture 30 for the threaded shank of the screw 26. The screw 26 is preferably provided with a head which is readily accessible for manipulation by a suitable wrench. The lever also includes a lower offset end 31 extending downwardly and forwardly from the locking element, an inclined portion 32, and an upper offset end 33 extending upwardly and rearwardly of the locking element. The lower offset end of the lever is located in a predetermined position with respect to the cross-pivot 3 connecting the arm sections 1 and 2 together and is provided with a hole 34 which receives the inner hooked end of the spring 9. The upper offset end 33 of the lever is provided with an aperture 35 through which the shank of the screw 6 extends. The screw 6 is provided with a reduced portion or neck 36 forming a shoulder or abutment 37. A portion of the upper offset end 33 of the lever embraces the neck and is normally held between the shoulder 37 and the depression 18 formed on the wall 17. When the screw 26 is tightened, as shown in Figure 4, the portion 29 of the lever will bear against the base wall 20 of the locking element to locate the point of connection between the lower offset end 31 of the lever and the spring an appreciable distance from the cross-pivot 3. The distance between the point of connection and the cross-pivot 3 can be gradually decreased by merely loosening the screw 26 and when loosened the screw 6 will primarily take the pull of the lever. In other words, this point of connection or fulcrum between the arm sections may be shifted with respect to the cross-pivot. More particularly, by changing the position of this fulcrum or leverage of the spring, without changing the effective length or tension of the spring, one can readily vary the pressure at the outer end of the wiper arm for urging a blade against a windshield. With this unique arrangement, the spring tension will remain substantially constant and as a result the efficiency and life of the spring will be prolonged. Moreover, any arm pressure desired can be obtained by simply adjusting the lever to any one of an infinite number of positions. The lever swings on the screw 6 when the screw 26 is actuated and the line of force exerted by the spring offers sufficient resistance to prevent accidental displacement of each screw after adjustment. The free end of the screw 26 is preferably swaged so that the screw cannot be removed from the lever.

A locking element may be mounted in a different way as disclosed and claimed in a copending application of Fred A. Krohm Serial No. 216,779, filed March 21, 1951, and one similar to the element 7 is disclosed and claimed in a copending application of Fred A. Krohm Serial No. 221,387, filed April 17, 1951.

The friction locking assembly whereby different effective lengths of the arm assembly may be obtained will now be described. More particularly, the friction locking assembly includes an elongated holding member 38 which is interposed between the bar arm section 4 and a pair of inturned integral lugs 39 formed on the walls adjacent the outer end of the channel arm section 2. The side walls of the channel section 2 are also provided with a pair of inturned abutments 40 similar to and spaced inwardly from the lugs 39. It will be noted that the channel arm section 2 of the arm is of a substantially uniform cross-section between its outer end and the abutments 40 and that an intermediate portion of the channel section is tapered or of a variable cross-section.

The holding member 38 may be formed to assume any shape desired but as herein illustrated preferably includes an outer offset end portion 41, a flat portion 42, an inclined portion 43 and an inturned inner end portion 44. The inner end portion 44 is provided with a hole, not shown, which detachably receives the outer hooked end of the spring 9 to normally pull the member 38 toward the cap section 1 of the arm. All of the portions of the holding member, except the outer offset end portion 41, are preferably arranged substantially within the confines of the channel arm section 2 and all of the portions, except the flat portion 42 which bears against the bar section 4, are spaced from the bar section. The offset end portion 41 is provided with an aperture 45. A manually operable lever 46 is interposed between the bar section 4 and the lever is provided with a transverse projection 47 disposed in the aperture 45 for pivotally connecting the lever to the holding member 38 for movement in an arc of 180 degrees. Attention is directed to the fact that the offset end 41 of the holding member is made yieldable and is provided with a cam portion 48 and a concave lip 49 having a detent 50 therein. The sides of the lever 46 are provided with corresponding bevels or chamfers 51 so that the lever will readily ride over the sharp edges on the offset end 41.

The components of the assembly are so constructed that when the lever is in either of the dotted line positions shown in Figure 3, the bar section 4 may be adjusted to any longitudinal position desired. When the lever is manipulated to the full line position so that the lever is caught in the detent 50 the offset end 41 of the holding member will be placed under sufficient tension to cause the lever to be forced against the bar section and the latter against the outer base wall of the channel arm section 2 to lock the bar section in the position to which it has been adjusted. More particularly, the lever when in a locking position tends to wedge the bar section and holding member apart and as a result the base wall of the channel 2 and the lugs 39 constitute abutments which in some measure limit the extent of the wedging action. Due to the fact that the holding member 38 is provided with a cam portion 48 the spring 9 will cause the cam portion to bear against the lugs 39 and force the holding member against the bar section 4 and the latter against the base of the channel section 2 so that when the bar section is extended to a desired position it normally temporarily stays in such position until the bar section is positively locked in place by the lever. In other words, sufficient friction is established to resist, with practical limits, longitudinal movement of the bar section. Outward movement of the bar section 4 is limited by a stop 52 thereon for engaging the inclined portion 43 of the holding member.

The channel section 2, bar section 4, holding member 38 and lever 46 are assembled in a unique manner. The bar section is preferably first inserted into the channel section 2 between its base wall and the lugs 39. The holding member 38 is then inserted into the channel section for a distance between the bar section and the lugs, after which the lever 46 is interposed between the holding member and bar section with the projection 47 on the lever disposed in the aperture 45 of the holding member, whereupon the holding member and lever as a unit are pressed into their respective positions as illustrated in Figure 2. More particularly, it will be apparent that the various portions of the holding member provide a formation which, among other things, more or less receives the lugs or abutment means 39 so as to assist in maintaining the holding member assembled with the channel section 2. If found desirable, this procedure may be varied by assembling the lever and holding member in advance of inserting the holding member into the channel section. The lever is usually held at right angles to the holding member during assembly and may be used as a handle for urging or pressing the holding member into the channel section 2. After the parts are thus more or less loosely assembled, the lever 46 may be swung to the full line position in alignment with the bar section 4 to positively lock the parts in place and particularly the arm section 4 with respect to the channel section 2. The arrangement is preferably such that the parts will not ordinarily accidentally become separated or detached when the lever is in an unlocked position and the spring 9 is not connected to the holding member 38. This feature is important because in some instances the procedure employed in manufacturing the arm may require that the spring 9 be connected to the holding member 38 following certain other assembly operations. However, insurance against accidental disassembly can, of course, be readily accomplished by merely moving the lever to a locking position before the spring 9 is attached to the holding member.

As indicated above, one of the objects of the invention is to provide a cover or shroud 11 for concealing from view the spring 9. The cover may be constructed and connected to the arm in different ways, but as herein illustrated, it is preferably detachably connected so that its outer reduced offset extremity 53 is caught and pressed between the inturned abutments 40 on the channel section 2 and the inclined portion 44 of the holding member 38 by means of the spring as clearly shown in Figure 2 of the drawing. The opposite extremity of the cover is preferably provided with a pair of inturned resilient fingers 54 having apertures 55 therein which receive inturned projections 56 formed on the side walls of the channel 2 as clearly shown in Figures 4 and 6. The cover is preferably tapered or of a shape to conform and fit in the channel arm section 2.

In view of the foregoing, it will be apparent that a number of novel features are embodied in the wiper arm assembly and that the spring 9 is utilized to form a plurality of functions including holding one extremity of the cover 11 in place.

While I have shown and described my invention in connection with a specified embodiment, it will, of course, be understood that I do not wish to be limited thereto, since it is apparent that other modifications may be made in such embodiment without departing from the spirit and scope of my invention as set forth in the appended claims.

I claim:

1. A windshield wiper arm comprising an inner shaft engaging section, an outer blade carrying assembly, a pivot pivotally connecting the section and assembly together, locking means mounted on the inner section for locking the arm to a shaft, means adjustable on the locking means, an elongated helical spring having one end connected to the assembly and its other end to the adjustable means, the arrangement being such that by manipulating the adjustable means, the adjustable means may be moved relative to the pivot so that the spring pressure may be varied.

2. A windshield wiper arm assembly adapted to be attached to a drive shaft comprising a housing adapted to receive an end of the shaft, an outer arm unit, a pivot pivotally connecting the outer arm unit to the housing, a screw swingably mounted on said housing for adjustment exteriorly thereof, a locking element for engaging the shaft end arranged in the housing and connected to said screw, a connector attached to the locking element, and a spring having one end connected to the outer arm unit and its other end to the connector, said connected being adjustable on the locking element so that the point of connection between the spring and connector can be shifted to any one of an infinite number of positions with respect to the pivot to vary the the leverage between the housing and outer arm unit.

3. A windshield wiper arm assembly adapted for attachment to a drive shaft comprising an inner fitting adapted to receive an end of the shaft, an outer arm unit, a pivot pivotally connecting the outer arm unit to the fitting, a locking device pivotally mounted on the fitting for engaging the shaft end to secure the arm assembly thereto, a connector carried by and adjustable on the locking device, and a spring having one end connected to the connector and its other end to the outer arm unit.

4. A windshield wiper arm assembly adapted for attachment to a drive shaft provided with an enlargement comprising an inner fitting adapted to receive the enlargement, an outer arm unit, pivot means pivotally connecting the outer arm unit to the fitting, a locking device mounted on the housing comprising a screw arranged for adjustment exteriorly of the fitting and a channel locking element supported on the pivot means and connected to the screw for engaging the enlargement, a lever arranged in the locking element and having one end attached to the screw, a second screw securing the lever to the locking element, and a spring having one end connected to the other end of the lever and its other end to the outer arm unit, said second screw affording adjustment of the lever to any one of many angular positions to vary the leverage between the outer arm unit and inner fitting.

5. A windshield wiper arm comprising an inner shaft engaging section, an outer blade carrying section, a pivot pivotally connecting the sections together, a support having a part mounted on the pivot, a screw extending through the inner section and threadedly connected to a part of the support, a second screw extending through another part of the support, a lever jointly carried by said screws, and an elongated helical spring having one end connected to the outer section and its other end to the lever, the arrangement being such that by manipulating the second screw, the position of the lever may be changed so that the arm pressure for pressing a wiper blade on the outer section against a windshield may be varied as desired without changing the tension of the spring.

6. A windshield wiper arm comprising an inner shaft engaging section, an outer arm section, a pivot pivotally connecting the sections together, locking means pivotally mounted on said pivot, a screw extending through the inner section and threadedly connected to the locking means, a lever, said lever having an opening in one end through which the screw extends and an aperture at its other end, a spring having one end connected to the outer arm section and its other end having a hook received in the aperture of the lever, a second screw extending through a part of the locking means and threadedly connected to the lever whereby the lever may be moved to any one of a number of different positions with respect to the pivot so that the arm pressure for urging a wiper blade on the outer section toward a windshield may be varied as desired.

References Cited in the file of this patent

UNITED STATES PATENTS

| Number | Name | Date |
|---|---|---|
| 218,227 | Brown | Aug. 5, 1879 |
| 260,608 | Retnour | July 4, 1882 |
| 528,406 | White | Oct. 30, 1894 |
| 610,405 | Lacoste | Sept. 6, 1898 |
| 1,908,824 | Devendor | May 16, 1933 |
| 2,008,890 | Weinstein | July 23, 1935 |
| 2,230,596 | Horton | Feb. 4, 1941 |
| 2,269,623 | Ehrlich | Jan. 13, 1942 |
| 2,326,402 | Smulski | Aug. 10, 1943 |
| 2,376,714 | Mussen | May 22, 1945 |
| 2,392,670 | Horton | Jan. 8, 1946 |
| 2,481,192 | Borsuk | Sept. 6, 1949 |
| 2,528,979 | Smulski | Nov. 7, 1950 |
| 2,557,755 | Nesson | June 19, 1951 |
| 2,558,131 | Green | June 26, 1951 |
| 2,561,879 | Norvey | July 24, 1951 |
| 2,569,532 | Marshall | Oct 2, 1951 |
| 2,596,181 | Soderberg | May 13, 1952 |
| 2,635,237 | Langer | Apr. 21, 1953 |

FOREIGN PATENTS

| Number | Country | Date |
|---|---|---|
| 285,204 | Great Britain | Feb. 16, 1928 |
| 689,127 | France | May 20, 1930 |